US008739893B2

(12) United States Patent
Braun (10) Patent No.: US 8,739,893 B2
(45) Date of Patent: Jun. 3, 2014

(54) MULTI-GEAR TRANSMISSION DEVICE AND POWER TOOL

(75) Inventor: Willy Braun, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 512 days.

(21) Appl. No.: 13/002,193

(22) PCT Filed: Nov. 21, 2008

(86) PCT No.: PCT/EP2008/066006
§ 371 (c)(1),
(2), (4) Date: Dec. 30, 2010

(87) PCT Pub. No.: WO2010/000341
PCT Pub. Date: Jan. 7, 2010

(65) Prior Publication Data
US 2011/0114348 A1  May 19, 2011

(30) Foreign Application Priority Data

Jun. 30, 2008  (DE) .......................... 10 2008 040 031

(51) Int. Cl.
*B25D 16/00*  (2006.01)
(52) U.S. Cl.
USPC ............. 173/109; 173/176; 173/178; 173/48; 173/216; 173/217; 74/392; 74/397; 74/473.12; 192/54.1
(58) Field of Classification Search
USPC ................... 173/109, 48, 216, 217, 176, 178; 74/392, 397, 473.12; 192/54.1
See application file for complete search history.

(56) References Cited

U.S. PATENT DOCUMENTS

| 1,564,667 | A | * | 12/1925 | Guild .............................. 74/333 |
| 2,911,841 | A | * | 11/1959 | Miller ............................. 74/342 |
| 2006/0207775 | A1 | * | 9/2006 | Armstrong ........................ 173/1 |
| 2009/0321102 | A1 | * | 12/2009 | Di Nicolantonio ........... 173/178 |

FOREIGN PATENT DOCUMENTS

| CN | 1446139 A | 10/2003 |
| CN | 2661382 Y | 12/2004 |
| CN | 1717300 A | 1/2006 |
| DE | 2412872 A1 | 10/1975 |
| DE | 3832202 C1 * | 3/1990 |
| DE | 41 35 240 A1 | 4/1993 |
| DE | 4302083 A1 | 7/1994 |
| EP | 0 608 083 A1 | 7/1994 |
| EP | 1 163 980 A2 | 12/2001 |

* cited by examiner

*Primary Examiner* — Michelle Lopez
(74) *Attorney, Agent, or Firm* — Maginot, Moore & Beck (57) ABSTRACT

The invention relates to a multi-gear transmission device, particularly a two-gear transmission device, for transferring a drive torque from an input side to an output side, which transmission device has at least two selectable gear ratios. The multi-gear transmission device further has a multi-stage clutch device, particularly a two-stage clutch device, with at least two different, selectable limit torques. According to the invention, the multi-stage transmission device has at least two preferably switchable translating gear pairs, and the multi-stage clutch device is included in the translating gear pairs.

20 Claims, 7 Drawing Sheets

MULTI-GEAR TRANSMISSION DEVICE AND POWER TOOL

CROSS-REFERENCE TO RELATED APPLICATION

This application is a 35 USC 371 application of PCT/EP2008/066006 filed on Nov. 21, 2008.

BACKGROUND OF THE INVENTION

1. Field of the Invention

The invention relates to a multi-gear transmission device, in particular a two-gear transmission device, for transmitting a drive torque from an input side to an output side of the multi-gear transmission device, having at least two selectable gear ratios and a multi-stage clutch device, in particular a two-stage clutch device that has at least two different selectable limit torques.

2. Description of the Prior Art

Several different multi-gear transmission devices for power tools are already known. A multi-gear transmission device is in particular understood here to mean a transmission device that has at least two selectable gear ratios GR1 and GR2 between an input side of the transmission device and an output side of the transmission device. Each of the gear ratios is in particular understood here to be a gear of the multi-gear transmission device.

EP 1 163 980 A2, for example, has disclosed a two-gear transmission device that has two transmission gear pairs. Each of the transmission gear pairs here is composed of a first transmission gear and a second transmission gear. The transmission gears here are embodied in the form of spur wheels, in particular spur gears. Each of the transmission gear pairs has a different tooth ratio TR1, TR2 so that it is possible to implement different gear ratios GR1, GR2. The respective first transmission gears here are mounted on a first transmission shaft for co-rotation therewith. The second transmission gears are situated in rotary fashion on a hollow shaft functioning as a second transmission shaft. On the inside of the hollow shaft, a slider element is provided by means of which one of the two second transmission gears can be selectively connected to the hollow shaft for co-rotation therewith. At one end of the hollow shaft, a bevel pinion is provided, which meshes with a bevel disc wheel. The bevel disc wheel in this case is mounted on a rotatably supported tool drive shaft, in particular a hammer tube, in a co-rotational fashion. The larger of the first transmission gears meshes with a spur pinion that is provided on a motor shaft of a drive unit, in particular an electric motor. The first transmission gears thus define an input side of the multi-gear transmission device, while the second transmission gears define an output side of the multi-gear transmission device. A drive torque MA of the drive unit is then transmitted to the tool drive shaft by means of the selectable co-rotation connection of one of the two second transmission gears to the hollow shaft.

There are also known transmission devices that include a multi-stage clutch device, in particular a two-stage clutch device. The multi-stage clutch devices in this case have at least two different selectable limit torques MG1, MG2 acting between an input side of the transmission device and an output side of the transmission device. If the currently applied drive torque MA exceeds the currently selected limit torque MGIst, then the multi-stage clutch device interrupts the torque transmission between the input side and the output side.

DE 38 32 202 C1, for example, has disclosed a two-stage clutch device that has two coupleable overload clutches arranged in series on a clutch shaft. The overload clutches in this case are selectively connected to each other and/or immobilized relative to a housing by means of a switchable, axially movable pin that is situated in a radially outer region of the overload clutch. As a result, depending on the switching position of the pin, two different limit torques MG1, MG2 are operative in relation to the clutch shaft.

ADVANTAGES AND SUMMARY OF THE INVENTION

The multi-gear transmission device according to the invention has the advantage that a very compact embodiment is achieved by accommodating the multi-stage clutch device in the transmission gear pairs of the multi-gear transmission device. This compact embodiment permits the multi-gear transmission device according to the invention to be integrated very easily into power tools, in particular hand-held power tools.

Each of the at least two transmission gear pairs has a first transmission gear and a second transmission gear. Advantageously, each first transmission gear is situated on a respective first transmission shaft that constitutes an input side of the multi-gear transmission device according to the invention. Each second transmission gear is situated on a respective second transmission shaft of the multi-gear transmission device, which shaft constitutes an output side of the multi-gear transmission device according to the invention. In a particularly preferred way, each first transmission gear permanently meshes with the respective second transmission gear of the respective transmission gear pair, thus synchronizing the multi-gear transmission device according to the invention.

If the first transmission gears of the respective transmission gear pairs are connected to the respective first transmission shaft for co-rotation therewith, it is thus possible to achieve an inexpensive embodiment of the multi-gear transmission device according to the invention. Preferably, the first transmission gears are embodied of one piece with the first transmission shaft. In particular, they constitute a stepped gear. A stepped gear is in particular understood here to mean a transmission gear pair that is embodied in one piece in which the two transmission gears have respective gear diameters D1, D2 that differ from each other.

In a particularly advantageous fashion, the second transmission gears of the transmission gear pairs are each embodied in the form of a ring gear. In this case, each of the second transmission gears is provided with a co-rotation connection. The co-rotation connection is in particular embodied in the form of one or preferably more co-rotation connection grooves.

In a particularly compact embodiment of the multi-gear transmission device according to the invention, the multi-stage clutch device has at least two clutch units, each of which includes an input wheel; each input wheel is respectively mounted in rotary fashion on the second transmission shaft. Each input wheel here is embodied in the form of a grooved bell; a detent profile is provided on the inside of the grooved bell.

A rugged embodiment of the multi-gear transmission device according to the invention is achieved in that each grooved bell defines a disk-shaped interior. In this case, the disk-shaped interiors of two grooved bells are positioned facing each other.

In a particularly functional embodiment, the input wheels of the multi-stage clutch device accommodate a clutch disc. In this case, the clutch disc has at least two detent element planes, each of which has at least one, but preferably several elastic detent elements situated on it. The clutch disc here is connected to the second transmission shaft for co-rotation therewith. In particular, the clutch disc can also be embodied of one piece with the second transmission shaft.

A particularly functional embodiment of the multi-gear transmission device according to the invention is achieved if the elastic detent elements of each detent element plane cooperate with the detent profile of exactly one input wheel so that when the respective input wheel executes a rotary motion around the second transmission shaft, it is possible to transmit a maximum limit torque MG between the input wheel and the clutch disc.

Advantageously, each input wheel of the multi-stage clutch device is provided with a rotary-driving connection. In particular, the rotary-driving connection can be embodied as one, preferably several rotary-driving grooves.

To ensure a particularly simple operation of the multi-gear transmission device according to the invention, a switching device is provided that makes it possible to switch between the at least two gear ratios GR1, GR2 and/or the at least two limit torques MG1, MG2 of the multi-gear transmission device according to the invention.

In an inexpensive embodiment, the switching device is embodied in the form of a switching ring. This switching ring has an engagement device that can be operatively connected to the co-rotation connection of at least one second transmission gear and/or to the rotary-driving connection of at least one input wheel of the multi-stage clutch device.

A particularly compact embodiment is achieved if the switching device is situated so that it is able to slide axially along the second transmission shaft, in particular is able to slide axially between at least two transmission gears.

In a particularly preferred modification of the multi-gear transmission device, an actuating device, in particular a mechanical actuating device, is provided. The actuating device includes at least one actuating element that engages with the switching device in such a way that it is possible to move the latter between at least two, preferably several, switching positions SP1, SP2.

In a particularly preferred additional modification of the multi-gear transmission device according to the invention, the actuating device includes at least one electrically drivable actuator.

In another preferred modification of a multi-gear transmission device according to the invention, at least one adjusting device is provided with which it is possible to adjust a detent engagement force FR of the elastic detent elements of at least one detent element plane. In particular, the detent force can be adjusted between at least two different detent engagement forces FR1, FR2.

In another aspect of the present invention, a power tool, in particular a hand-held power tool, is equipped with a drive unit, a tool drive shaft, and a multi-gear transmission device according to the invention. If the drive unit is operatively connected to the tool drive shaft via the multi-gear transmission device in order to implement a switchable rotary driving of the tool drive shaft, then this achieves a particularly advantageous power tool that can be used in a flexible way. To achieve this, in particular the drive unit is coupled to the input side of the multi-gear transmission device according to the invention and the tool drive shaft is coupled to the output side of the multi-gear transmission device according to the invention.

In a particularly convenient modification of the power tool according to the invention, a selecting device is provided. With the selecting device, a user can choose between the at least two gear ratios GR1, GR2 and/or the at least two limit torques MG1, MG2 of the multi-gear transmission device according to the invention. Preferably, the selecting device has at least one selecting element situated on a machine housing of the power tool so that it is accessible to the user.

Operating convenience is significantly improved if the power tool according to the invention is also provided with an adjusting device by means of which the user, using an adjusting means, can adjust the detent engagement force of at least one, but preferably all, of the elastic detent elements of at least one clutch unit.

A particularly easy-to-operate power tool according to the invention is achieved if the adjusting means cooperates with the selecting device, in particular is integrated into it.

BRIEF DESCRIPTION OF THE DRAWINGS

Exemplary embodiments of the invention are shown in the drawings and will be explained in greater detail in the subsequent description.

DESCRIPTION OF THE PREFERRED EMBODIMENTS

Figure 1:
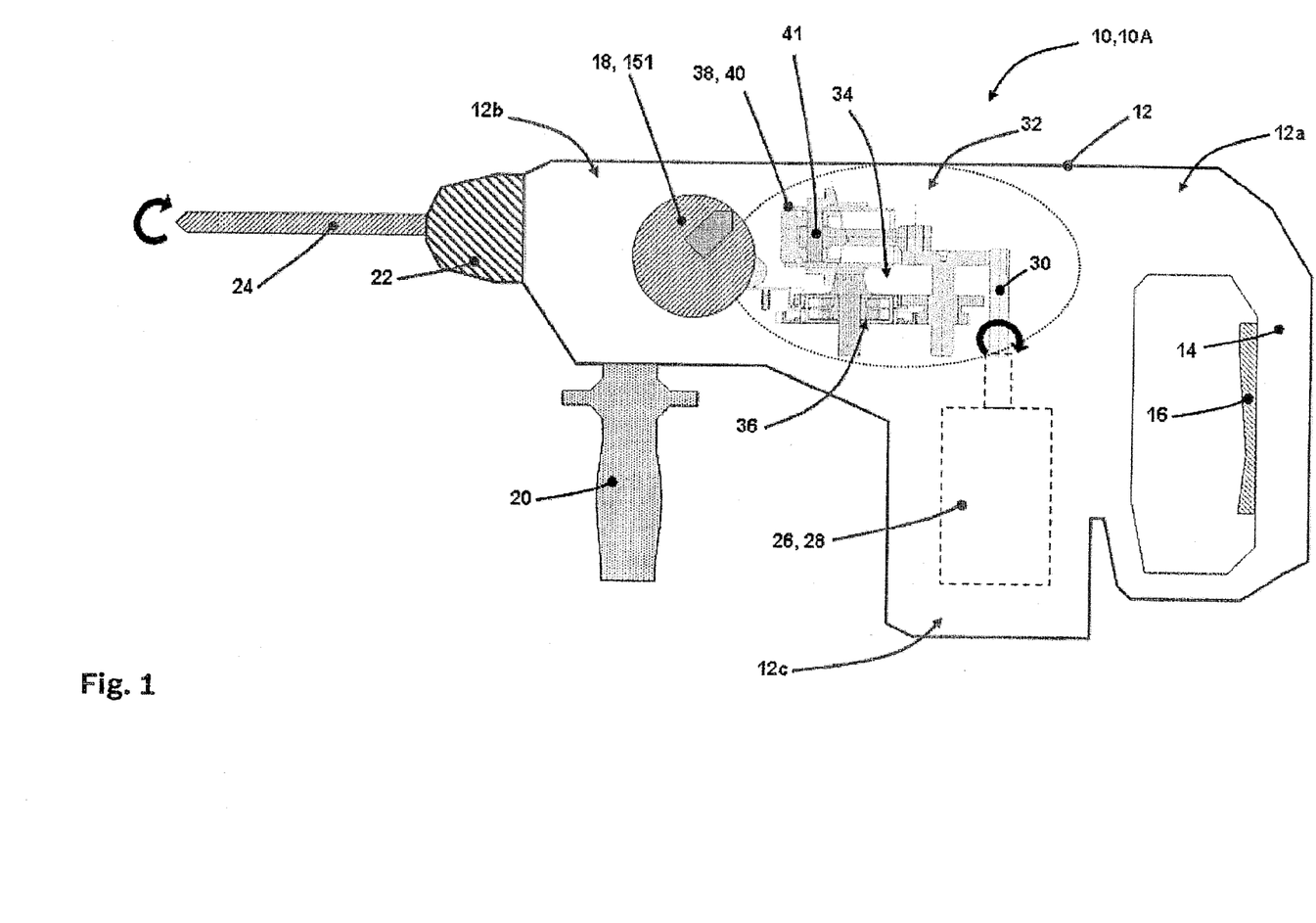
FIG. 1 is a schematic side view of a rotary hammer.

FIG. 1 is a schematic side view of a rotary hammer 10a as an example of a power tool 10, in particular a hand-held power tool according to the invention. In this case, the rotary hammer 10a has a machine housing 12. A main hand grip 14 provided with a main controller element 16 is situated in a rear region 12a of the machine housing 12.

On a front region 12b of the machine housing 12 oriented away from the main hand grip 14, an operating mode switch 18 is provided. In the embodiment shown here, the operating mode switch 18 is embodied in the form of a rotary switch; it is also conceivable for other types of switch to be used, in particular slide switches, detent switches, selector levers, and/or electronic switch elements. An auxiliary hand grip 20 is also provided in the front region 12b. A rotary drivable tool holder 22 is provided at a front end surface of the front region 12b. An insert bit 24 is accommodated in a replaceable fashion in the tool holder 22.

A drive unit 26, in particular an electric motor 28, is accommodated in a lower region 12c of the machine housing adjacent to the main hand grip 14. It is depicted with dashed lines in FIG. 1. The drive unit 26 drives a motion converting device 32 by means of a drive shaft 30. The motion converting device 32 includes a multi-gear transmission device 34 according to the invention. According to the invention, the multi-gear transmission device 34 includes a multi-stage clutch device 36.

The multi-gear transmission device 34 here transmits a drive torque MA of the drive unit 26 to a tool drive shaft 38, which in the current example is embodied in the form of a hammer tube 40. In the present exemplary embodiment of a power tool according to the invention, the hammer tube 40 contains an impact mechanism, in particular an air cushion impact mechanism, which is sufficiently well-known. FIG. 1 shows only an impact mechanism piston unit 41 of the impact mechanism. The tool holder 22 is connected, in particular detachably, to the tool drive shaft 38 for co-rotation therewith. The insert bit 24 in turn is replaceably accommodated in the tool holder 22 for co-rotation therewith. In this way, a torque can be transmitted via the tool drive shaft 38 and tool holder 22 to the insert bit 24 contained therein.

Figure 2:
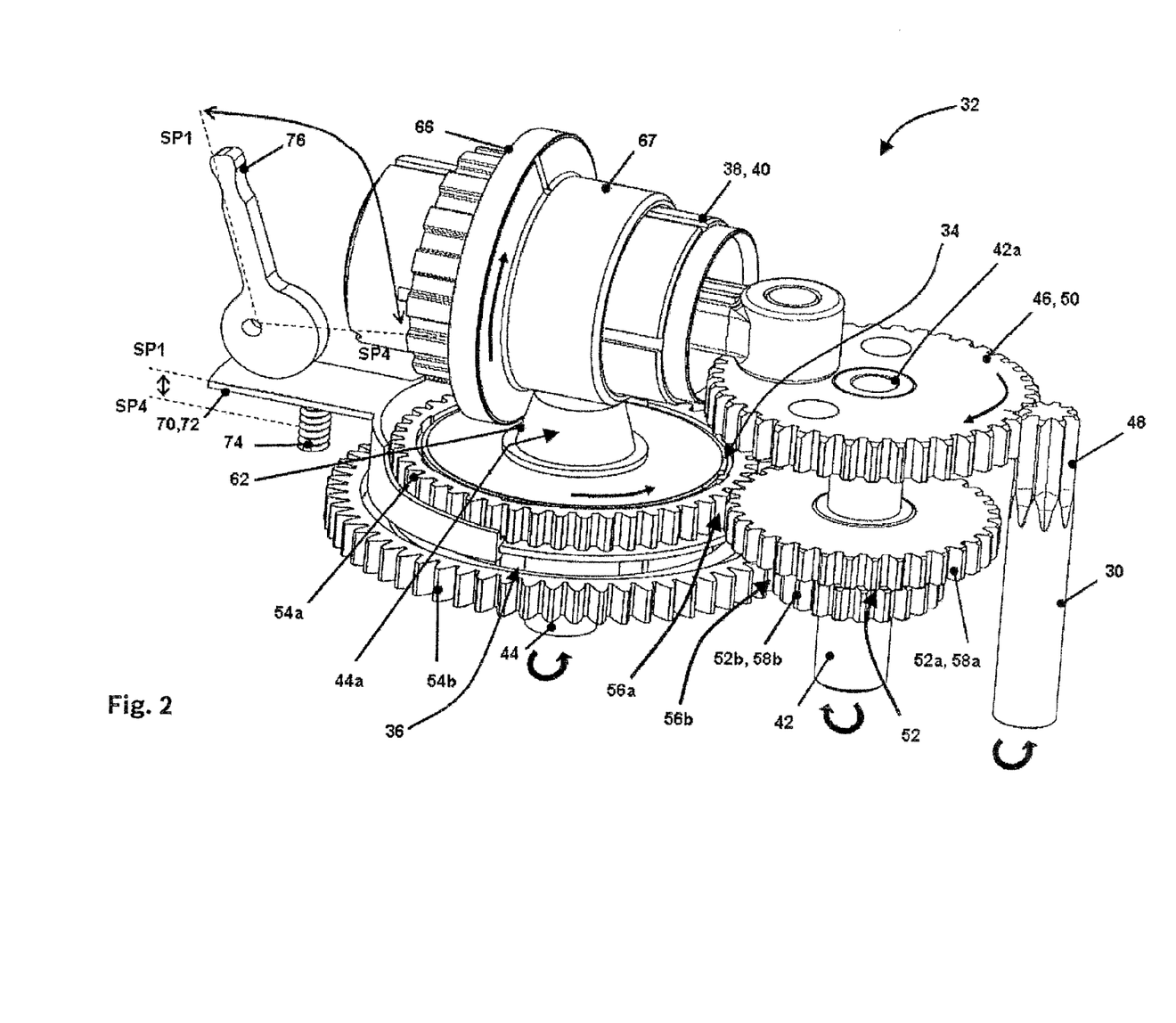
FIG. 2 is a perspective view of a first exemplary embodiment of a multi-gear transmission device according to the invention.

FIG. 2 shows a motion converting device 32 of the kind known from FIG. 1. The motion converting device 32 is equipped with a multi-gear transmission device 34 according to the invention. The multi-gear transmission device 34 includes a first transmission shaft 42 and a second transmission shaft 44 situated parallel to the first transmission shaft 42. In the present exemplary embodiment, the first transmission shaft 42 is situated parallel to the motor shaft 30 of the drive unit 26 in the machine housing 12. The transmission shafts 42 and 44 in this case are supported so that they can rotate freely in the machine housing 12; the bearings themselves are not depicted in FIG. 2.

An eccentric gear 46 embodied in the form of a spur gear is situated on a first end 42a of the first transmission shaft 42 and preferably, is connected to the first transmission shaft 42 for co-rotation therewith. An output pinion 48 is provided on the motor shaft 30. In the present example, the output pinion 48 is embodied of one piece with the motor shaft; multi-part embodiments are also conceivable. The output pinion 48 transmits a rotary motion of the motor shaft 30 and therefore the drive torque MA of the drive unit 26 to the eccentric gear 46.

Through its co-rotation connection to the first transmission shaft 42, the eccentric gear 46 defines an input side of the multi-gear transmission device 34 according to the invention. A stepped gear 52 is also situated on the first transmission shaft 42 and is preferably coupled to the first transmission shaft 42 for co-rotation therewith. The stepped gear 52 in this case is situated beneath the eccentric gear 46. The stepped gear 52 has a first spur gear 52a and a second spur gear 52b. In the present example, a diameter D11 of the first spur gear 52a is selected to be greater than a diameter D12 of the second spur gear 52b.

The multi-stage clutch device 36 according to the invention is situated on the second transmission shaft 44. FIG. 2 shows the multi-stage clutch device 36 in an assembled state so that essentially, only a first ring gear 54a embodied in the form of a spur gear and a second ring gear 54b embodied in the form of a spur gear are visible. The ring gears 54a, 54b are situated around the second transmission shaft 44 in an axial stack along the second transmission shaft 44.

The ring gears 54a, 54b are embodied so that they each cooperate with one of the spur gears 52a, 52b of the stepped gear 52. In this context "embodied" is in particular understood to mean situated and/or designed. "Cooperate" is in particular understood here to mean "mesh with." The spur gear 52a and the ring gear 54a thus constitute a first transmission gear pair 56a of the multi-gear transmission device 34 according to the invention. In the present example, a second transmission gear pair 56b is constituted by the spur gear 52b and the ring gear 54b. In connection with the multi-gear transmission device 34 according to the invention, therefore, the spur gears 52a, 52b are also referred to as so-called first transmission gears 58a, 58b. The ring gears 54a, 54b of the multi-stage clutch device 36 are also understood in this connection to be second transmission gears 60a, 60b. The ring gear 54a here has a diameter D21 of its spur gear 55a, while the ring gear 54b is characterized by a diameter D22 of its spur gear 55b. The diameters D11 and D21 of the first transmission gear pair 56a and the diameters D12 and D22 of the second transmission gear pair 56b are in particular matched so as to maintain a constant distance of the first transmission shaft 52 from the second transmission shaft 44.

At one end 44a of the second transmission shaft 44, an output gear 62 embodied in the form of a bevel gear is also provided, preferably connected to the second transmission shaft for co-rotation therewith. The output gear 62 here defines the output side 64 of the multi-gear transmission device 34 according to the invention.

A rotary drive gear 66 is situated on the tool drive shaft 38 and can be connected to the tool drive shaft 38 for co-rotation therewith. The rotary drive gear 66 meshes with the output gear 62 so that the tool drive shaft 38 can be driven to rotate by means of the multi-gear transmission device 34 according to the invention. In the exemplary embodiment shown here, the rotary drive gear is connected to a switching sleeve 67 for co-rotation therewith and preferably, is embodied of one piece with it. The switching sleeve 67 is situated on the tool drive shaft 38 in sliding fashion and is connected to it for co-rotation therewith. The rotary drive gear 66 can be brought into engagement with and disengaged from the output gear 62 by sliding the switching sleeve 67 axially along the tool drive shaft 38. The rotary drive of the tool drive shaft 38 is therefore embodied as switchable.

The multi-gear transmission device 34 according to FIG. 2 also has an actuating device 68. The actuating device 68 has an actuating means 70, which in the present example is embodied in the form of a selector fork 72. The actuating means 70 is brought into a predefined first switching position SP1 by a restoring element 74, which in the present example is embodied in the form of a helical spring. The actuating means 70 can be brought into at least one other switching position SP2 by means of a lever element 76.

An eccentric pin 80 is situated on the eccentric gear 46 of the motion converting device 32, spaced radially apart from a first transmission axis 78. A connecting rod 82 engages with the eccentric pin 80, in particular one end of the connecting rod 82 is movably fastened to the eccentric pin 80. Another end of the connecting rod 82 is movably connected to the piston unit 41. An apparatus composed of at least the eccentric gear 46, the eccentric pin 80, and the connecting rod 82 is also referred to as the impact mechanism drive unit 84. In particular, the impact mechanism drive unit 84 can also be understood to be a component of the motion converting device 32.

Figure 3:
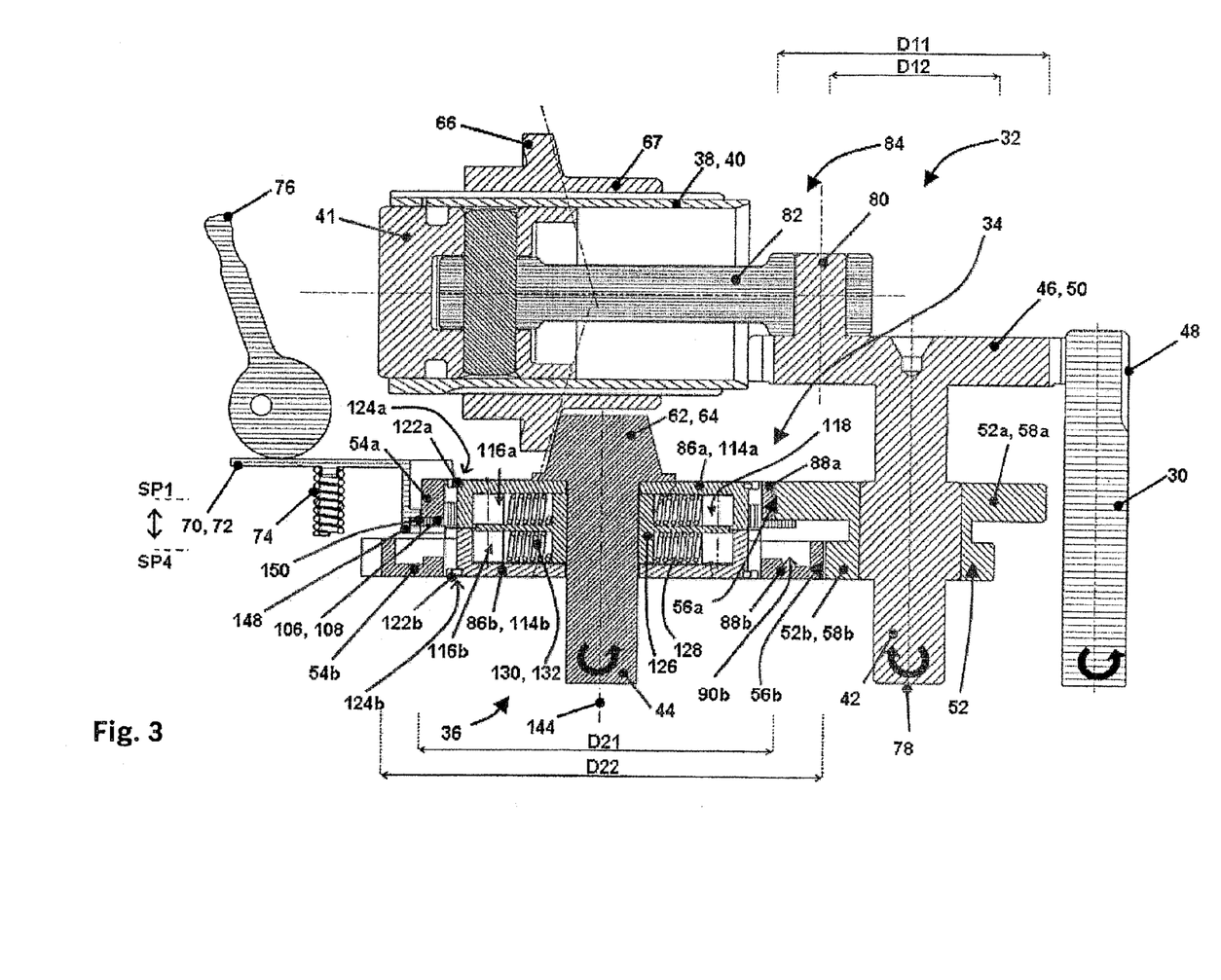
FIG. 3 shows a cross-section through the multi-gear transmission device according to FIG. 2.

FIG. 3 is a sectional side view of the motion converting device 32, with the multi-gear transmission device 34 according to the invention from FIG. 2. In particular, this view shows the structure of the multi-stage clutch device 36.

The multi-stage clutch device 36 has two input wheels 86a, 86b, which are situated around the second transmission shaft 44, inside the ring gears 54a, 54b. Each input wheel 86a, 86b here is supported in freely rotating fashion on the second transmission shaft 44.

In the present exemplary embodiment, aside from differing in their diameters D21, D22, the ring gears 54a, 54b also differ in their cross-section 88a, 88b. The cross-sections 88a, 88b here are embodied so that the ring gears 54a, 54b each have essentially the same inner diameter D1, D2. To that end, the cross-section 88b of the ring gear 54b is equipped with a recess region 90b.

On a radial inside 92a, 92b, in particular a radially inner surface 93a, 93b, each of the ring gears 54a, 54b respectively has at least one, but preferably several, co-rotation connection means 94a, 94b. On a radial outside 96a, 96b, in particular a radially outer surface 97a, 97b, each input wheel 86a, 86b respectively has at least one, but preferably several, rotary-driving means 98a, 98b. In the present example, the co-rotation connection means 94a, 94b are embodied as co-rotation connection grooves 100a, 100b; the co-rotation connection grooves 100a, 100b are let into the inner surfaces 93a, 93b of the ring gears 54a, 54b, preferably distributed essentially uniformly over the circumference of the inner surfaces 93a, 93b. In the present embodiment, the rotary-driving means 98a, 98b are analogously embodied in the form of rotary-driving grooves 102a, 102b. The rotary-driving grooves 102a, 102b are let into the outer surfaces 97a, 97b of the input wheels 86a, 86b, preferably distributed essentially uniformly over the circumference of the outer surfaces 97a, 97b. In a particularly preferred embodiment, the co-rotation connection grooves 100a, 100b and/or the rotary-driving grooves 102a, 102b of each gear pair 104a, 104b —respectively comprised of one ring gear 54a, 54b and one input wheel 86a, 86b—are provided in equal numbers and are distributed uniformly over the circumference of the inner surfaces 93a, 93b and outer surfaces 97a, 97b.

Along the second transmission shaft 44 in the axial direction between the gear pairs 104a, 104b, a switching means 106 is situated so that it is able to move axially in a limited fashion. In the present example, the switching means 106 is embodied in the form of a switching ring 108. On an inner diameter 110, the switching ring 108 is equipped with one, preferably several, engaging components 112. In a particularly preferred embodiment, the engaging components 112 are distributed uniformly over a circumference of the switching ring 108. The at least one engaging component 112 is embodied in such a way that through an axial movement of the switching ring 108, the engaging component 112 produces a form-locked connection with at least one co-rotation connection groove 100a, 100b and at least one rotary-driving groove 102a, 102b. There are also conceivable embodiments in which engaging components 112' are provided, which can produce a frictional, nonpositive or a frictional, form-locked connection with at least one co-rotation connection groove 100a, 100b and at least one rotary-driving groove 102a, 102b.

In the embodiment shown in FIG. 3, the input wheels 86a, 86b of the multi-stage clutch device 36 are embodied in the form of grooved bells 114a, 114b. Each grooved bell 114a, 114b defines a disk-shaped interior 116a, 116b that extends in the form of a circular disk around the second transmission shaft 44. In the present embodiment, the grooved bells 114a, 114b are aligned axially with each other so that the two disc-shaped interiors 116a, 116b essentially adjoin each other directly. This forms a clutch interior 118. The upper grooved bell 114a rests axially against a contact surface 120 that is provided on the output gear 62 and is rotatable relative to the grooved bell 114a. The lower grooved bell 114b is supported on an axial bearing, not shown here, in the machine housing 12 of the power tool 10. To prevent an axial slippage of the ring gears 54a, 54b relative to the associated input wheels 86a, 86b or grooved bells 114a, 114b, after assembly, the grooved bells 114a, 114b and associated ring gears 54a, 54b are each secured by a respective retaining ring 122a, 122b that is accommodated in a receiving groove 124a, 124b provided on the respective grooved bell 114a, 114b.

A clutch disc 126 is provided on the clutch interior 118. In this case, the clutch disc 126 is connected, in particular rigidly, to the second transmission shaft 44 for co-rotation therewith. In particular, the clutch disc 126 can be attached to the second transmission shaft 44 through nonpositive, frictional engagement, through form-locked engagement, and/or through material adhesion. It is also conceivable for the clutch disc 126 to be manufactured as integrally joined to, particularly of one piece with, the second transmission shaft 44. In particular, this can be achieved through the use of sintering and injection molding techniques.

Figure 4:
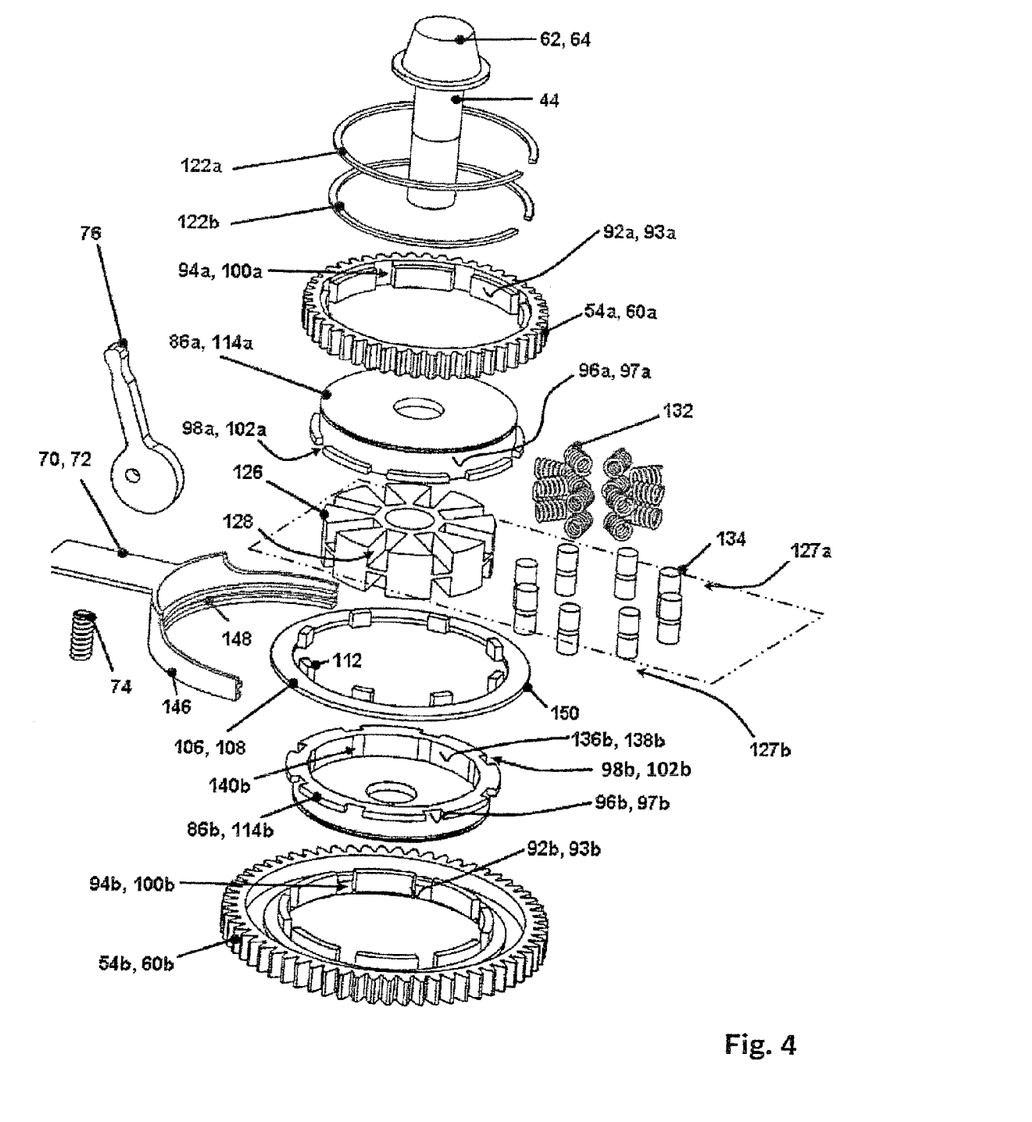
FIG. 4 is an exploded view of the transmission device according to the invention according to the first exemplary embodiment, viewed along the second transmission shaft.

As is particularly visible in FIG. 4, radially extending recesses 128 that are open toward the outer diameter and at the end surface are provided in the clutch disc 126. In the present exemplary embodiment, the clutch disc 126 has two detent element planes 127a and 127b of recesses 128. In addition, the recesses 128 are distributed essentially uniformly around the circumference, particularly in a radially symmetrical fashion.

Each recess 128 of each detent element plane 127a, 127b accommodates an elastic detent element 130. The elastic detent elements 130 in this case are embodied in the form of a detent component 134 loaded by a spring element 132. In the present example, the spring element 132 is embodied in the form of a helical spring. It is also possible, however, for other types of spring elements 132 such as leaf springs, elastomers, and/or spring components to be used in a multi-stage clutch device 36 according to the invention. The detent components 134 in the present example are embodied in the form of detent cylinders; in a preferred embodiment, in particular detent balls and other detent element shapes can be advantageous.

In an installed state, as shown among other things in FIG. 3, the elastic detent elements 130 are accommodated in the recesses 128 and prestressed with a detent engagement force FR. A detent profile 138a, 138b with detent recesses 140a, 140b is provided on a respective inner surface 136a, 136b of each of the grooved bells 114a, 114b. In the exemplary embodiment shown, a detent profile 138a, 138b is provided on a circumference surface facing into the clutch interior 118. As indicated in FIG. 4, each detent profile 138a, 138b has groove-shaped detent recesses 140a, 140b. Only the detent profile 138b and the detent recesses 140b are visible in the depiction in FIG. 4. The grooved bell 114a of the multi-gear transmission device 34 according to the invention is embodied in an analogous fashion. These detent recesses 140a, 140b are preferably likewise distributed uniformly around the circumference. In particular, the number of detent recesses 140a, 140b is equal to or greater than the number of the elastic detent elements 130 in a detent element plane 127a, 127b of the clutch disc 126. A detent element plane 127a, 127b, together with the associated detent profile 138a, 138b of the corresponding grooved bell 114a, 114b or input wheel 86a, 86b, constitutes a clutch unit 142a, 142b. In the present example, the multi-stage clutch device 36 therefore has two clutch units 142a, 142b.

In its operation, each of the clutch units 142a, 142b corresponds to an overload clutch that is sufficiently known from the relevant literature. The elastic detent elements 130 push their detent components 134 with the predefined the detent engagement force FR into the detent recesses 140a, 140b provided. A limit torque MG at which the clutch unit 142a, 142b releases is essentially determined by the detent engagement force FR of an elastic detent element, the number NR of the elastic detent elements 130, the radial distance RA of the detent recesses 140a, 140b from a second transmission axis 144, and the friction and rolling properties of the detent components 134 in the detent recesses 140a, 140b. The "release of a clutch" is understood here in particular to be the interruption of a flow of force or torque transmission from the input wheel 86a, 86b of the clutch unit 142a, 142b to the clutch disc 126 and therefore to the second transmission shaft 44. If this limit torque is exceeded, the input wheel 86a, 86b disengages relative to the clutch disc 126.

At a fork-shaped end 146, the actuating means 70 has a groove-shaped engaging means 148. This engaging means 148 embraces a lip 150 of the switching ring 108 so that the latter is able to move in rotary fashion. If the lever element 76 is moved from a first switching position into another switching position, then the switching ring 108 is slid in the axial direction along the second transmission shaft 44 so that the engaging component 112 is slid between the different co-rotation connection grooves 100a, 100b and/or the rotary-driving grooves 102a, 102b.

FIGS. 5a through 5d show the multi-stage clutch device 36 of the multi-gear transmission device 34 according to the invention in four different switching positions SP1, SP2, SP3, and SP4 of the switching ring 108.

Figure 5A:
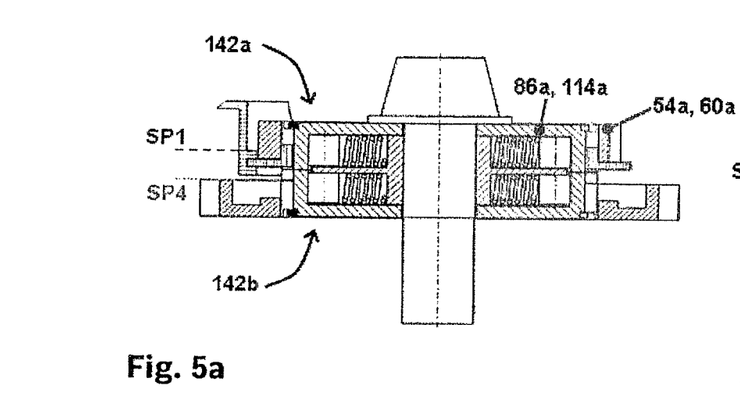
FIGS. 5a through 5d show the second transmission gears with the multi-stage clutch device according to the first exemplary embodiment, in four different switching positions.

FIG. 5a shows the switching ring 108 in its first switching position SP1. In this switching position, the engaging components 112 engage in the co-rotation connection grooves 100a of the upper ring gear 54a and in the rotary-driving grooves 102a of the upper input wheel 86a and connect them for co-rotation with one another. In this switching position, the lower ring gear 54b and a lower input wheel 86b are not coupled to each other so that no rotary driving of the lower input wheel 86b occurs. A torque transmission can therefore occur only via the upper clutch unit 142a when the multi-stage clutch device 36 is in switching position SP1. The limit torque MG1 of the clutch unit 142a is thus selected as the currently applied limit torque MGIst.

The selection of the ring gear 54a in the switching position SP1 simultaneously selects the first transmission gear pair 56a of the multi-gear transmission device 34 since the ring gear 54a is the second transmission gear 60a of the first transmission gear pair 56a. In the embodiment according to FIGS. 1 through 5, therefore, a low gear ratio GR1 is operative since the diameter D11 of the first transmission gear 58a is greater than the diameter D21 of the second transmission gear 60a. This is in particular referred to as a first, lower gear of the multi-gear transmission device 34.

In the switching position SP1 of the multi-gear transmission device 34 according to the invention, the insert bit 24 is driven to rotate as follows: if the drive unit 26 is in an activated state, then the motor shaft 30 transmits a rotary motion with a drive torque MA' and speed U1 to the eccentric gear 46 via the output pinion 48. By means of the co-rotation connection of the eccentric gear 46 to the first transmission shaft 42, the rotary motion is transmitted to the first transmission shaft 42; this produces a speed U2 of the first transmission shaft 42 that depends on a gear ratio GRM of the output pinion 48 and eccentric gear 46. This is described by the equation:

$$U2=GRM \cdot U1.$$

Since the stepped gear 52 is likewise connected to the first transmission shaft 42 for co-rotation therewith, the rotary motion is transmitted to the stepped gear 52. In this case, the stepped gear 52 includes the two first transmission gears 58a, 58b of the multi-gear transmission device 34 according to the invention, which transmit the rotary motion to the respectively associated second transmission gear 60a, 60b of the transmission gear pairs 56a, 56b. In this case, the two transmission gear pairs 56a, 56b have different gear ratios GR1, GR2 essentially defined by the diameter D11, D21, D12, D22 and/or in the case of gears, by the tooth numbers ZN11, ZN21, ZN12, ZN22, which is described by the following equation:

$$GR1 = \frac{D21}{D11} = \frac{ZN11}{ZN21} \qquad GR2 = \frac{D22}{D12} = \frac{ZN12}{ZN22}.$$

The ring gears 54a, 54b therefore rotate at different respective speeds U3a, U3b that are calculated as follows:

$$U3a=GR1 \cdot U2 \quad U3b=GR2 \cdot U2.$$

In the present example, as seen in FIGS. 1 through 5, GR1 is lower than GR2 so that the speed U3b is greater than the speed U3a. Since in switching position SP1, only the ring gear 54a is connected to the input wheel 86a for co-rotation therewith, the rotary motion is transmitted to the second transmission shaft 44 only via the clutch unit 142a. The second transmission shaft 44 and thus the output gear 62 connected to the shaft for co-rotation therewith therefore rotate at the speed U3a. If the switching sleeve 67 is slid so that the rotary drive gear 66 engages with the output gear 62, then the rotary motion of the output gear 62 is transmitted to the rotary drive gear 66 and therefore to the tool drive shaft 38. The tool drive shaft 38 then rotates at a speed U4a, which is the result of the speed U3a multiplied by a gear ratio GRA of the output gear 62 and rotary drive gear 66:

$$U4a=GRA \cdot U3a=GRA \cdot GR1 \cdot GRM \cdot U1.$$

Since the tool drive shaft 38 and the tool holder 22 are connected to each other for co-rotation, the insert bit 24, which is accommodated in the tool holder 22 for co-rotation therewith, likewise rotates at the speed U4a.

In the present case, a maximum usable working torque MW on the insert bit 24 is limited by the limit torque MG1 of the multi-stage clutch device 36 since only the clutch unit 142a is currently transmitting the rotary motion. Conversely, if the insert bit 24 jams, this also does not cause a reaction torque, which exceeds the limit torque MG1, to be exerted on the user of the power tool 10 according to the invention. If the insert bit 24 jams, the reaction torque increases until the limit torque MG1 is exceeded in the multi-stage clutch device 36. In this case, the multi-stage clutch device 36 releases and interrupts a flow of force from the drive unit 26 to the tool drive shaft 36.

Figure 5B:
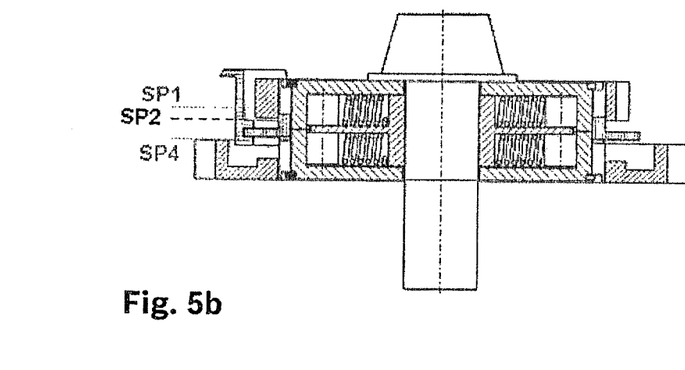

If the switching ring 108 is slid from the switching position SP1 into a switching position SP2, then the engagement components 112 also engage with the rotary-drive grooves 102b of the input wheel 86b. This state is depicted in FIG. 5b. The discussion below will concentrate solely on the differences from the description of FIG. 5a. Since the fundamental function is identical, reference is hereby made to the preceding description.

In the switching position SP2, there is a co-rotation connection between the ring gear 54a and both of the input wheels 86a, 86b so that the rotary motion of the ring gear 54a is transmitted to both input wheels 86a, 86b. In this case, the ring gear 54a rotates at the above-defined speed U3a. Since both of the clutch units 142a, 142b are now engaged, a flow of force from the ring gear 54a to the second transmission shaft 44 is divided into two sub-paths that each extend through one of the two clutch units 142a, 142b. As a result, an effective limit torque MGmax is reached in the multi-stage clutch device 36, which is essentially equal to the sum of the limit torque MG1 of the clutch unit 142a and the limit torque MG2 of the clutch unit 142b.

In the switching position SP2 of the switching ring 108, the insert bit 24 rotates at the above-indicated speed U4a, but the maximum usable working torque MW is now limited by the higher limit torque MGmax of the multi-stage clutch device 36.

Figure 5C:
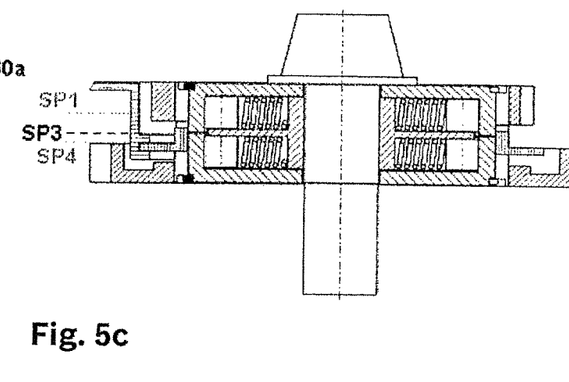

If the shifting ring 108 is slid into a switching position SP3, then the engaging components 112 disengage from the co-rotation connection grooves 100a of the ring gear 54a while they come into engagement with the co-rotation connection grooves 100b of the ring gear 54b. As before, however, the engagement components 112 remain engaged with the rotary-driving grooves 102a, 102b of both input wheels 86a, 86b so that in the multi-stage clutch device 36, the higher limit torque MGmax is effectively selected, as described in the preceding section. In switching position SP3, the co-rotation connection of the ring gear 54b to the input wheels 86a, 86b transmits the rotary motion of the drive unit 26 via the second transmission gear pair 56b. Now the gear ratio GR2 is operative for the rotary motion of the second transmission shaft 44. The rotary motion of the insert bit 24 is calculated in a fashion analogous to the previous approach:

$$U4b=GRA \cdot U3b=GRA \cdot GR2 GRM \cdot U1.$$

In the switching position SP3 of the switching ring 108, therefore, the insert bit 24 rotates at the higher speed U4a and the maximum usable working torque MW is limited by the limit torque MGmax.

Figure 5D:
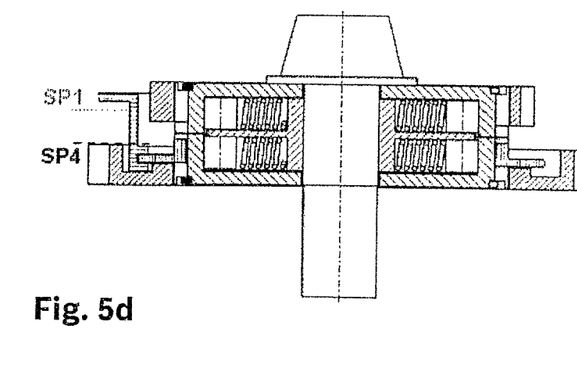

If the switching ring 108 is slid into a switching position SP4, then the engaging components 112 disengage from the rotary-driving grooves 102a of the input wheel 86a. In this case, however, similarly to switching position SP3, the engaging components remain engaged with the co-rotation connection grooves 100b so that the calculation approach from the preceding section applies with regard to the speed of the insert bit 24. When the multi-stage clutch device 36 is in the switching position SP4, only the clutch unit 142b is effectively connected to the ring gear 54b so that the flow of force is transmitted in an undivided fashion from the ring gear 54b via the clutch unit 142b to the second transmission shaft 44. The maximum usable working torque MW is thus limited by the limit torque MG2 of the multi-stage clutch device 36.

If the two clutch units 142a, 142b are identically embodied, as in the present instance, then the limit torques MG1, MG2 are essentially equal. It can, however, be advantageous to embody the clutch units 142a, 142b with limit torques MG1', MG2' that differ from each other.

Furthermore, there are conceivable multi-stage clutch devices 36 for multi-gear transmission devices according to the invention that have more than two clutch units 142a, 142b; the clutch units 142a, 142b can be selectively activated and deactivated by means of a suitable switching means 106. In addition, there are possible multi-stage clutch devices 36 that include differently embodied clutch units 142a, 142b. Thus at least partially in lieu of radially acting elastic detent elements 130, it is also possible to use axially acting detent mechanisms.

In a particularly preferred embodiment, the lever element 76 is also operatively connected to the operating mode switch 18 on the machine housing 12, permitting the user to adjust the switching position of the lever element 76 in operating modes of the operating mode switch 18 that are provided for this purpose. In particular, the switching means 106 is embodied so that it can be controlled via the operating mode switch 18. The operating mode switch 18 thus functions as a selecting device 151 that permits the user to select between the at least two gear ratios GR1, GR2 and/or the at least two limit torques MG1, MG2 of the multi-gear transmission device.

In a preferred modification, the actuating device 68 has at least one actuator—in particular an electrically drivable actuator—that is able to move the switching means 106 between the different switching positions. The actuator makes it possible to produce a power tool according to the invention, which is equipped with an electronic control and/or a regulating unit that is able to trigger a switching between different gears and/or limit torques of the multi-gear transmission device 34 according to the invention.

Figure 6:
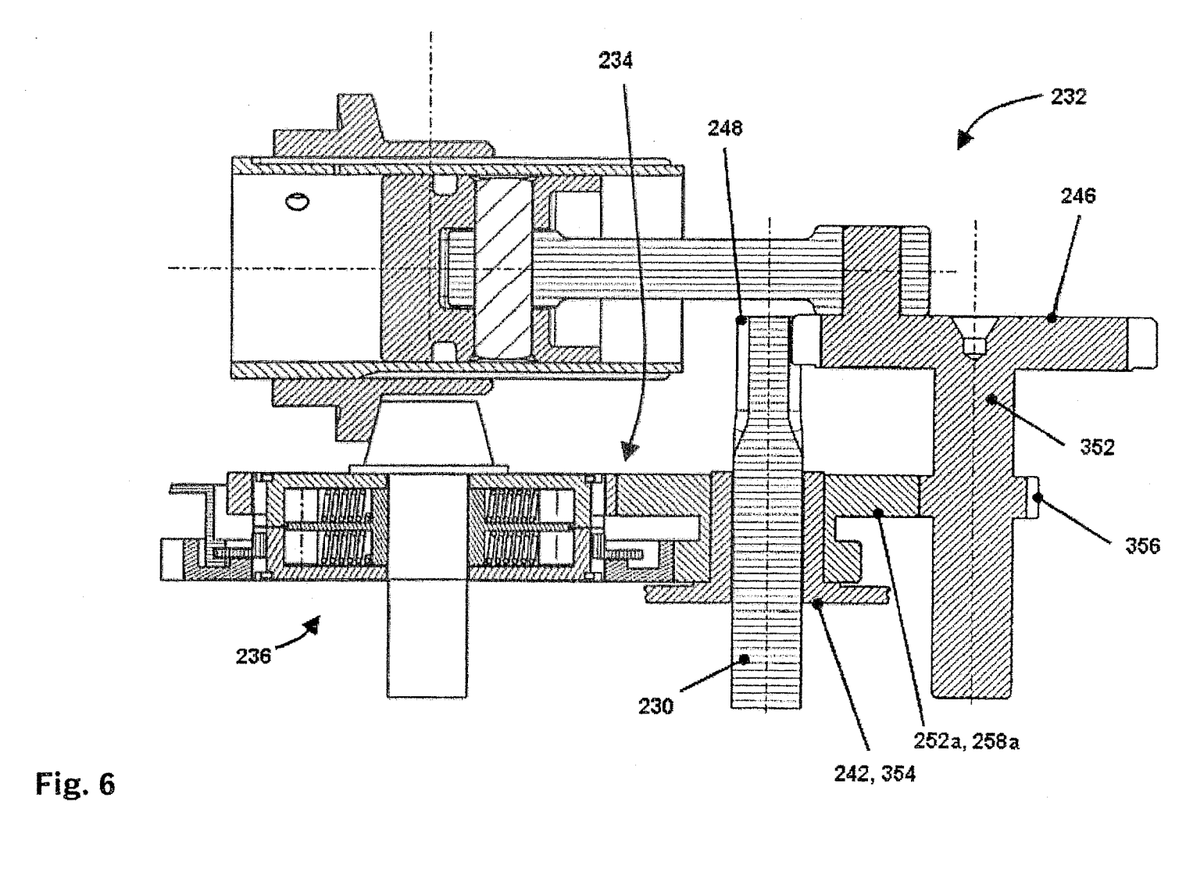
FIG. 6 is a sectional side view of a second exemplary embodiment of a multi-gear transmission device according to the invention.

FIG. 6 shows a second exemplary embodiment of the motion converting device 232 with a multi-gear transmission device 234 according to the invention. Features that are the same or that function in the same way have been labeled here with the same reference numerals, increased by 200.

The structure of the multi-stage clutch device 236 here corresponds to the structure of the above-described exemplary embodiment so that reference is hereby made to the preceding description. The second exemplary embodiment differs from the already known embodiment through a changed arrangement of the motor shaft 230. As shown in the side view in FIG. 6, it is situated between and parallel to the second transmission shaft 244 and an additional eccentric shaft 352. In the present example, the first transmission shaft 242 is embodied in the form of a hollow shaft 354, with the motor shaft 230 passing through the hollow shaft 354 in a freely rotatable fashion. The hollow shaft 354 in turn rotatably supports the already known stepped gear 252 of the multi-gear transmission device 234.

The output pinion 248 of the motor shaft 230 meshes with a spur gearing of the eccentric gear 246, thus permitting the eccentric shaft 352 to be rotary driven. In addition, a spur gear 356 is connected to the eccentric shaft 352 for co-rotation therewith, in particular is embodied of one piece with the eccentric shaft 352. The spur gear 356 meshes with a spur gear 252a of the stepped gear 252, thus permitting the stepped gear 252 to be rotary driven. The remaining structure of the multi-gear transmission device 234 corresponds to the already known exemplary embodiment.

There are also only small differences to note with regard to the function, which are essentially reflected in an expanded calculation of the speed U4a, U4b of the insert bit 224 as a function of the speed U1 of the motor shaft 230. Through the flow of force from the output pinion 248 via the eccentric gear 246 and the spur gear 356 to the spur gear 252a, an additional gear ratio GRT is operative, which is defined by the spur gear 356 and the spur gear 252a. The gear ratio GRT in this case depends on a diameter DT of the spur gear 356 and the diameter D11 of the spur gear 252a. This is described by the equation:

$$GRT = \frac{D11}{DT}$$

For the speeds U4a, U4b of the insert bit 224, it follows analogously from the first exemplary embodiment that:

$$U4a=GRA \cdot U3a=GRA \cdot GRT \cdot GR1 \cdot GRM \cdot U1$$

$$U4b=GRA \cdot U3b=GRA \cdot GRT \cdot GR2 \cdot GRM \cdot U1$$

Otherwise, the second exemplary embodiment corresponds in function to the already described first exemplary embodiment, whose description is included here by reference.

Figure 7:
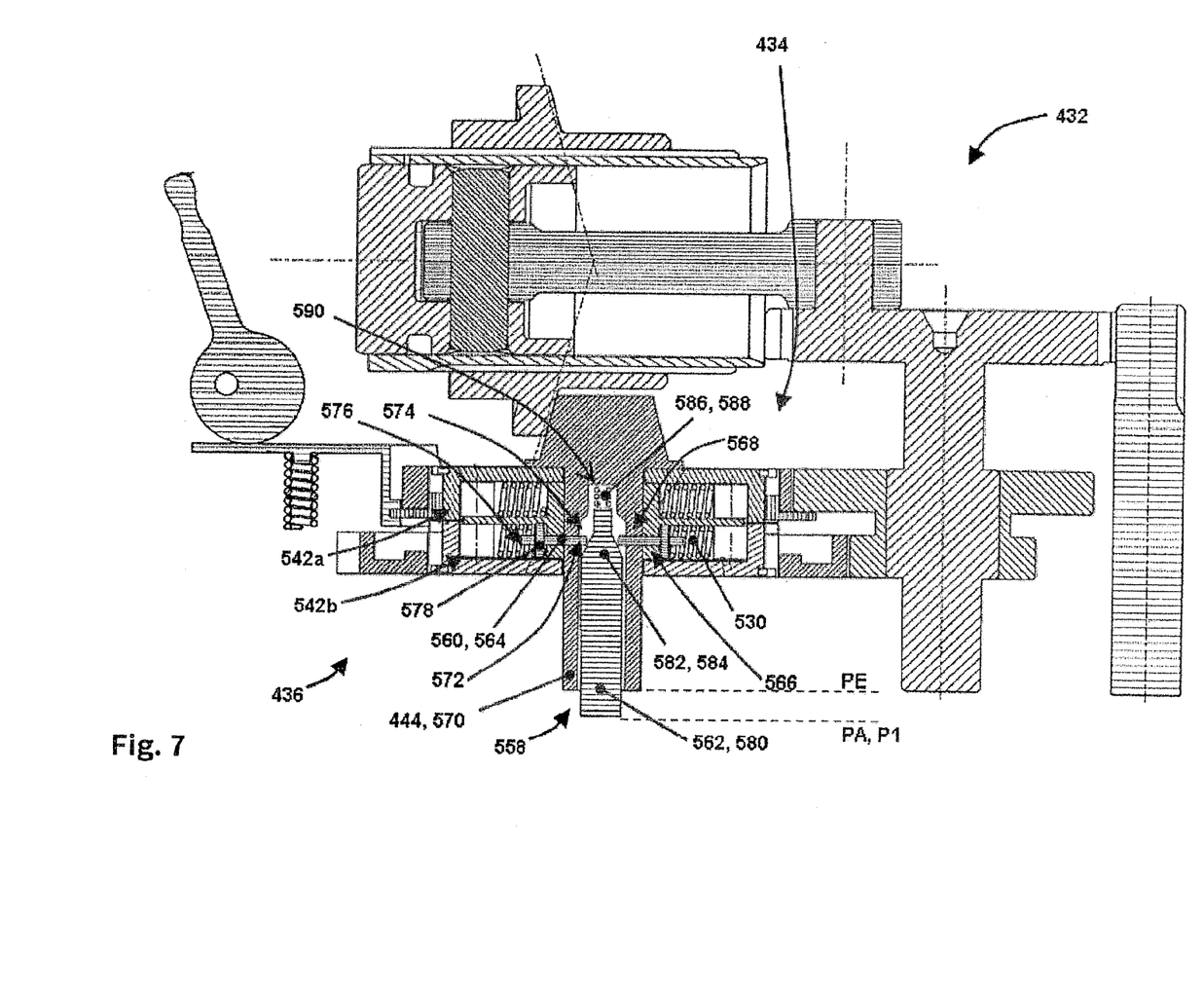
FIG. 7 is a sectional side view of a third exemplary embodiment of a multi-gear transmission device according to the invention.

FIG. 7 shows a third exemplary embodiment of the motion converting device 432 with a multi-gear transmission device 434 according to the invention; the structure, in particular an arrangement of the first and second transmission shafts 442, 444 is essentially the same as in the first exemplary embodiment. Features that are the same or function in the same way have been provided with the same reference numerals, increased by 400.

The multi-stage clutch device 436 of the third exemplary embodiment also includes an adjusting device 558 for adjusting the detent engagement force FR of at least one, preferably all, of the elastic detent elements 530 of at least one clutch unit 542a, 542b. To that end, the adjusting device has at least one adjusting means 560 and one control element 562. In the present example according to FIG. 7, the adjusting means 560 is embodied in the form of an adjusting slider 564. In the detent element plane 527b of the clutch disc 526, a passage 566 for the adjusting slider 564 is provided, which coincides with another passage 568 in the second transmission shaft 444 embodied in the form of a hollow shaft 570. The adjusting slider 564 is accommodated in the passages 566, 568 in a radially sliding fashion. The adjusting slider 564 protrudes with one end 572 into a bore 574 in the hollow shaft 570. A second end 576 of the adjusting slider 564 protrudes into the recess 128 of the clutch disc 126. The adjusting slider 564 also has a support ring 578, which the elastic detent element 530, in particular the spring element 532, rests against. Preferably, an adjusting slider 564 is provided for each elastic detent element 530 of the detent element plane 527b. The detent engagement force FR of the elastic detent elements 530 of the detent element plane 527b can be varied by sliding the adjusting slider 564 in the radial direction. In particular, this permits the detent engagement force FR of the clutch unit 542b to be embodied as adjustable so that the limit torque MG2 of the clutch unit 542b can be adjusted between a minimum value MG2min and a maximum value MG2max.

In the embodiment according to FIG. 7, the radially inner ends of the adjusting sliders 564 rest against the control element 562 embodied in the form of a control slider 580. The control slider 580 is accommodated in an axially sliding fashion in the bore 574 of the hollow shaft 570. At its end 582 that is inserted into the bore 574, the control slider 580 has a radially circular axial profile 584. In particular, a diameter of the control slider 580 decreases toward the tip. If the control slider 580 is slid axially, the position of the adjusting sliders 564 in the radial direction changes, thus changing the force of the spring elements 532 and therefore the detent engagement force FR of the elastic detent elements 530.

In a preferred embodiment, a restoring element 586 is also provided, which moves the control slider 580 back into a preferred control position P1, in particular a starting position PA. In the embodiment shown here, the restoring element 586 is embodied in the form of a helical spring 588, which is accommodated in the bore 574 in front of the control slider 580 in the insertion direction of the control slider 580. In this case, one end of the helical spring rests against the inserted end 582 of the control slider 580 and the other end rests against a contact surface 590 in the hollow shaft 570.

By using another adjusting means, not shown here, which is situated on the machine housing 412 in a position accessible to the user and acts on the control slider 580 so that between the starting position PA and an end position PE, the user can adjust the limit torque MG2 of the multi-stage clutch device 436 between the values MG2min and MG2max. In a particularly preferred embodiment, the adjusting means is situated on the selecting device 551, in particular is integrated into the selecting device 551.

In a preferred modification, the axial profile 584 has two, preferably more than two, diametrical steps that correspond to different graduations of detent engagement force FR.

In another preferred modification, two—in particular all— of the clutch units 542a, 542b have adjusting means 560. In this case, the adjusting means 560 can be identically embodied. It can also be advantageous, however, for the adjusting means 560 of different clutch units 542a, 542b to be embodied differently.

In addition to the adjusting means 560 and/or control elements 562 shown here, it is also possible for other mechanical and/or electromechanical motion converting devices such as levers, pulls, rods, or actuators to be used in advantageous modifications of multi-gear transmission devices according to the invention, without altering the concept of the invention.

Other advantageous modifications and enhancements can in particular be produced through combinations of the features of the exemplary embodiments described above.

In particular, it can be advantageous if the power tool equipped with the multi-gear transmission device according to the invention has at least one display and/or signal unit, which provides the user with an indication of the selected gear ratio GR1, GR2 and/or the selected limit torque MG1, MG2.

In another very advantageous modification, a restoring device can be provided, which returns the multi-stage clutch device to a low limit torque, preferably to the lowest possible limit torque, in particular automatically.

The foregoing relates to the preferred exemplary embodiments of the invention, it being understood that other variants and embodiments thereof are possible within the spirit and scope of the invention, the latter being defined by the appended claims.

The invention claimed is:

1. A multi-gear transmission device in particular a two-gear transmission device, for transmitting a drive torque from an input side to an output side, comprising:
at least two selectable gear ratios and a multi-stage clutch device, in particular a two-stage clutch device, that has at least two different selectable limit torques; and
at least two preferably switchable transmission gear pairs, wherein the multi-stage clutch device is accommodated in the transmission gear pairs,
wherein each of the at least two transmission gear pairs has a first transmission gear on a first transmission shaft constituting the input side of the multi-gear transmission device and a second transmission gear on a second transmission shaft constituting the output side, and
wherein that the multi-stage clutch device has at least two clutch units, each of which includes an input wheel, which is embodied as a grooved bell that has a detent profile provided on an inner surface thereof, and each input wheel is respectively mounted in freely rotating fashion on the second transmission shaft.

2. The multi-gear transmission device as recited in claim 1, wherein each grooved bell defines a disk-shaped interior and the disk-shaped interiors of two grooved bells are positioned facing each other.

3. The multi-gear transmission device as recited in claim 1, wherein each input wheel of the multi-stage clutch device accommodates a clutch disc which has at least two detent element planes, which each have at least one, but preferably several elastic detent elements situated thereon, and the clutch disc is connected to the second transmission shaft for co-rotation therewith.

4. The multi-gear transmission device as recited in claim 3, wherein the elastic detent elements of each detent element plane cooperate with the detent profile of exactly one input wheel so that when the respective input wheel executes a rotary motion around a second transmission shaft, it is possible to transmit a maximum limit torque between the input wheel and the clutch disc.

5. The multi-gear transmission device as recited in claim 3, wherein at least one adjusting device is provided with which it is possible to adjust a detent engagement force of the elastic detent elements of at least one detent element plane, in particular between at least two different detent engagement forces.

6. The multi-gear transmission device as recited in claim 1, wherein each input wheel of the multi-stage clutch device is provided with a rotary-drive, having particular one, preferably several, rotary-driving grooves.

7. A power tool, in particular a hand-held power tool, equipped with a drive unit, a tool drive shaft, and a multi-gear transmission device as recited in claim 1, wherein it is possible for the drive unit to be operatively connected to the tool drive shaft via the multi-gear transmission device in order to implement a switchable rotary driving of the tool drive shaft, and it is possible to couple the drive unit to the input side of the multi-gear transmission device and to couple the tool drive shaft to the output side.

8. The power tool as recited in claim 7, wherein a selecting device is provided, permitting a user to choose between the at least two gear ratios and/or the at least two limit torques of the multi-gear transmission device.

9. The power tool as recited in claim 8, wherein an adjusting device is provided, permitting a user to use an adjusting element to adjust a detent engagement force of at least one elastic detent element of at least one clutch unit.

10. The power tool as recited in claim 9, wherein the adjusting element cooperates with the selecting device, and in particular is integrated into the selecting device.

11. A multi-gear transmission device, comprising:
at least two selectable gear ratios and a multi-stage clutch device that has at least two different selectable limit torques; and
at least two switchable transmission gear pairs,
wherein the multi-stage clutch device is accommodated in the at least two transmission gear pairs,
wherein the multi-stage clutch device includes a first clutch unit having a first limit torque and a second clutch unit having a second limit torque,
wherein the multi-stage clutch device has a first operating state, in which the first clutch unit is engaged, and a second operating state, in which the second clutch unit is engaged, and
wherein the multi-stage clutch device has a third operating state, in which both the first clutch unit and the second clutch unit are engaged.

12. The multi-gear transmission device as recited in claim 11, wherein each of the at least two transmission gear pairs has a first transmission gear on a first transmission shaft constituting the input side of the multi-gear transmission device and a second transmission gear on a second transmission shaft constituting the output side.

13. The multi-gear transmission device as recited in claim 12, wherein each second transmission gear of the transmission gear pairs are embodied as a ring gear and each of the second transmission gears is provided with a co-rotation connection, in particular embodied as one or more co-rotation connection grooves.

14. The multi-gear transmission device as recited in claim 13, wherein a switching device is provided that makes it possible to switch between the at least two gear ratios and/or the at least two limit torques of the multi-gear transmission device.

15. The multi-gear transmission device as recited in claim 14, wherein the switching device is embodied as a switching ring, which has an engagement component that is operatively connectable to the co-rotation connection of at least one second transmission gear and/or to a rotary-drive of at least one input wheel of the multi-stage clutch device.

16. The multi-gear transmission device as recited in claim 14, wherein the switching device is situated so that it is able to slide axially along the second transmission shaft, in particular is able to slide axially between at least two second transmission gears.

17. The multi-gear transmission device as recited in claim 14, further comprising an actuating device, which includes at least one actuating element that engages with the switching device in such a way that it is possible to move the latter between at least two, preferably several, switching positions.

18. The multi-gear transmission device as recited in claim 17, wherein the actuating device includes at least one electrically drivable actuator.

19. The multi-gear transmission device as recited in claim 11, wherein first transmission gears of the transmission gear pairs are connected to a respective first transmission shaft for co-rotation therewith, and are embodied of one piece with the respective first transmission shaft, and constitute a stepped gear.

20. A multi-gear transmission device as recited in claim 11, wherein:
in the first operating state the second clutch unit is disengaged, and
in the second operating state, the first clutch unit is disengaged.

* * * * *

UNITED STATES PATENT AND TRADEMARK OFFICE
CERTIFICATE OF CORRECTION

| | | |
|---|---|---|
| PATENT NO. | : 8,739,893 B2 | Page 1 of 1 |
| APPLICATION NO. | : 13/002193 | |
| DATED | : June 3, 2014 | |
| INVENTOR(S) | : Willy Braun | |

It is certified that error appears in the above-identified patent and that said Letters Patent is hereby corrected as shown below:

In the Claims

In column 16, line 43, the first line of Claim 20 should read --

"20. The multi-gear transmission device as recited in claim 11,"

Signed and Sealed this
Eleventh Day of November, 2014

Michelle K. Lee
*Deputy Director of the United States Patent and Trademark Office*